Figure 1:
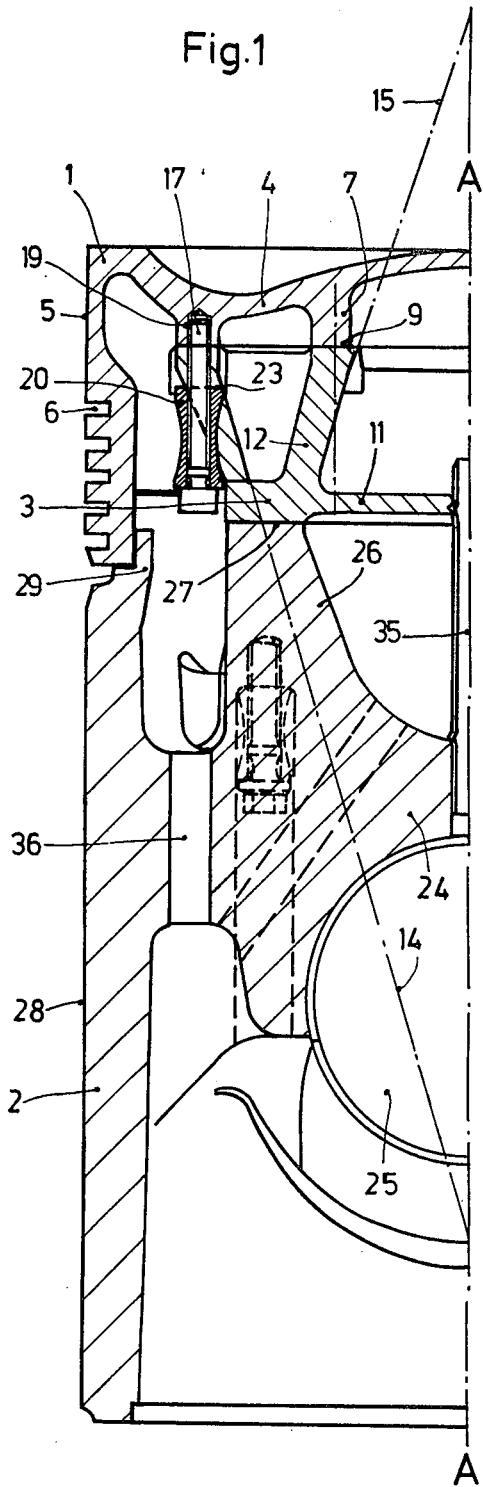

United States Patent [19]

Öttl et al.

[11] 3,915,141
[45] Oct. 28, 1975

[54] BUILT UP ENGINE PISTON

[75] Inventors: Adolf Öttl, Stadtbergen; Ernst Pfleiderer, Königsbrunn, both of Germany

[73] Assignee: M. A. N. Maschinenfabrik Augsburg-Nurnberg Aktiengesellschaft, Augsburg, Germany

[22] Filed: Jan. 23, 1974

[21] Appl. No.: 435,828

[30] Foreign Application Priority Data
Feb. 15, 1973 Germany............................ 2307347

[52] U.S. Cl. .......... 123/193 P; 29/156.5 C; 92/216; 92/221; 92/255
[51] Int. Cl.²............................................ F02F 3/00
[58] Field of Search ............ 123/193 P; 29/156.5 R; 92/216, 220, 221, 255

[56] References Cited
UNITED STATES PATENTS

| | | | |
|---|---|---|---|
| 1,089,823 | 3/1914 | Day et al. ........................ | 123/193 P |
| 3,520,234 | 7/1970 | Hill et al. ............................. | 92/220 |

*Primary Examiner*—Charles J. Myhre
*Assistant Examiner*—William C. Anderson
*Attorney, Agent, or Firm*—William R. Woodward

[57] ABSTRACT

A piston, particularly for use in heavy diesel motors, is built up of a piston head, an intermediate piece and a lower piston body piece. The piston head has internal annular ridges extending down to a plane joint surface and of a minimum height sufficient to accommodate tapped holes for the screws that fasten the middle piece to the piston head. The middle piece has a disc or annular base with a lower annular mounting surface and upwardly extending annular webs that meet the ridges of the piston head. The webs are disposed on conical surfaces that have their vertices on the piston axis, the outermost one having a vertex below the middle piece and the other having its vertex above. Additional webs and ridges may be used for very wide pistons. The bottom piece has a tapered annular upward extension meeting the base of the middle piece beneath the supporting webs and provision for screwing the bottom and middle piece together. An upper skirt forms part of the piston head and carries grooves for piston rings. An upward projection of the lower skirt serves to center the upper skirt. Efficient transmission of forces to the piston rod bearing with relatively light component parts and even distribution of thermal stresses is obtained as well as freedom from loosening the structure under suction.

17 Claims, 2 Drawing Figures

U.S. Patent   Oct. 28, 1975   3,915,141

BUILT UP ENGINE PISTON

This invention relates to a piston construction for a four-cycle internal combustion engine, particularly for heavy diesel motors. The pistons here concerned are of the built-up type with an upper face portion or piston head and a piston body portion demountably held together in mutually supporting relation by machine screws.

It is an object of this invention to provide a piston of the type just described that will behave well under the loads created by thermal and mechanical effects so that the structure will have a long useful life.

The thermal and mechanical shocks which the pistons must withstand in operation strain the portions of the piston which fasten its parts together.

SUBJECT MATTER OF THE PRESENT INVENTION

Briefly, the piston head is provided with at least two inner annular ridges at different radial spacing from the longitudinal axis of the piston, by means of which the piston head is supported on the piston body and in which the tapped bores for the fastening screws are provided.

By the use of the invention not only can a relatively thinner piston head be provided having a wall thickness more like that of the walls of the piston, which leads to a favorably even distribution of stress, but also it is not necessary to provide substantial massing of material (unfavorable for stress distribution) in the region of the ridges. In consequence only very small movements of the piston head relative to the piston body occur in operation. Canting and other distortion of the ridges are also avoided to a very large extent. A further advantage is assurance that there will be no loosening of the piston head from the piston body during suction strokes. The piston according to the invention, moreover, has a small weight compared to the heavy explosion forces it is capable of responding to.

Preferably the height of the ridges in the direction of the piston axis corresponds substantially to the necessary depth of the screw threads. Distortion of the piston head cannot be completely avoided, but when it does occur as the result of thermal stresses, the support surfaces provided by such ridges can hardly be skewed relative to the facing support surfaces of the piston body.

It is advantageous in a piston according to the invention for the piston body to be composed of separate middle and bottom portions, the latter arranged to carry a piston rod bearing. These two portions of the piston body are demountably connected together by additional screws located at a radius greater than the piston rod bearing. Such a construction offers the advantage of simple assembly, since first the piston head can be screwed fast to the piston middle portion without the insertion of the screws being impeded by the piston rod bearing.

In accordance with a further development of the invention the piston middle portion is provided with a base of disc or annulus shape on the side facing the piston bottom portion and weblike support members extend from this base to meet and support the ridges of the piston head. In this manner a very easy mode of construction can be obtained without any impairment of endurance or of the capacity to withstand high explosion pressures.

In accordance with a further advantageous aspect of the invention, the weblike support members are shaped so as to be disposed on the surface of a cone the vertex of which is on the longitudinal axis of the piston. In particular it is advantageous for the support member that bears against the piston head ridge having the greatest radial distance from the piston axis to be disposed on the surface of a cone the vertex of which is located further below on the piston axis, such conical surface passing through the piston rod bearing. It is helpful for another weblike supporting member to be disposed on the surface of a cone the vertex of which lies above the piston head. By these means good transmission of the forces are obtained in the piston in spite of the relatively light weight of the parts to which the forces are applied.

A further feature having the same purpose is the provision of the piston lower portion in a form comprising a core surrounding the piston rod bearing integral with a carrier piece extending in the direction of the annular portion of the piston middle portion which carries the support members and tapering in that same direction. The lower piston body portion also includes the bottom section of the piston skirt. The upper part of the piston skirt, provided with grooves for piston rings, is made integral with the piston head.

Figure 2:
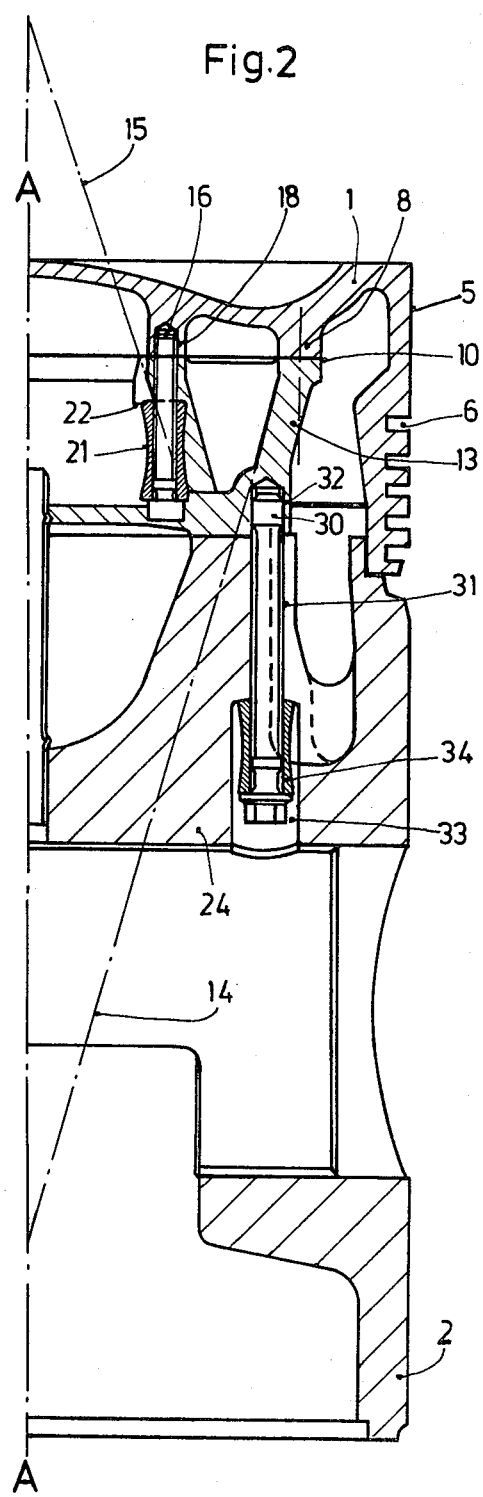

The invention is described by way of example with reference to the accompanying drawing, in which:

FIG. 1 is a radial cross-section of a piston in accordance with the present invention, showing only the cross-section on one side of the axis of the piston, because of the symmetry of the cross-section about the axis, and FIG. 2 is a radial cross-section of the piston at FIG. 1 taken at right angles to the cross-section plane of FIG. 1 and, likewise, showing only one of the symmetrical halves of the cross-section.

The engine piston shown in the drawing comprises a piston head 1, a middle piece 3 and a bottom piece 2. The piston head 1 is made of steel or cast steel and has a piston face 4 and an upper piston skirt 5 connecting with the piston face at its periphery. Several grooves 6 are provided on the skirt 5 for seating piston rings. On the underside of the piston face 4 are two ridges 7 and 8 encircling the longitudinal axis A—A of the piston. The ridges 7 and 8 have mounting surfaces 9 and 10, which may be referred to as support surfaces, lying in a horizontal plane.

The middle piece 3, which is made of a material having a greater elasticity modulus than gray cast iron, comprises, for example, a disc-shaped base 11 and weblike support members 12 and 13 rising from this base. The support members 12 and 13, like the ridges 7 and 8 are ring-shaped and surround the piston axis A—A. The support member 13 is so curved as to be disposed on a conical surface indicated by the dashed lines 14. The vertex of that concial surface lies on the piston axis A—A. The supporting web 12 is likewise shaped so as to be disposed on the surface of a cone indicated by the dashed lines 15. The vertex of this cone also lies on the piston axis A—A, in this case above the piston head 4. Particularly in the case of very large piston diameters one or two more supporting webs cooperating with corresponding ridges on the inside of the piston head may be provided.

The piston head 1 and the middle piece 3 are screwed together by necked-down screws 16 and 17. The screws 16 and 17 extend through cavities or cutouts in the supporting webs 12 and 13 and grip respectively in the tapped holes 18 and 19 set in the ridges 7 and 8 respectively. It is convenient for the design to be such that the height of the shortest ridge 8 in the direction of the piston axis A—A corresponds substantially to the necessary depth of the tapped threads 19. The tapped bores 18 are disposed at regular spacing in the ridge 7 and the tapped bores 19 likewise at regular spacing in the ridge 8. The heads of the screws 16 and 17 are supported, in order to obtain the longest possible expansion length, in spacing bushings 20 and 21 which in turn bear against supporting surfaces 22 and 23 of the supporting web structure 12 and 13 in the neighborhood of the cavities or cutouts provided to allow passage of the screws 16 and 17. The diameter of the shafts of the screws 16 and 17 in the neighborhood of the joint surface 9, furthermore, is smaller than the diameter of the bores in the ridges 7 and 8 and in the spacing bushings 20 and 21, so that a slight radial movement of the piston head 1 relative to the middle piece 3 is possible during heating of the parts in operation.

The bottom piece 2, which is made of aluminum or of spheroidally graphitic cast iron, comprises a core 24 in which a piston rod bearing 25 is provided. Extending from the core 24 is an annular carrier portion 26 encircling the piston axis A—A which tapers down upwardly and ends in a mounting joint surface 27. The mounting surface 27 fits against the corresponding annular portion of the base 11 of the middle piece 3 in the assembled condition of the piston. In the region of this annular portion where the middle and bottom pieces meet, the supporting webs 12 and 13 have their lower extremities. The joint surfaces 9 and 27 run parallel to each other and perpendicular to the piston axis A—A. The core 24 also carries the lower piston skirt 28 which is preferably formed integral therewith. The lower piston skirt 28 has a ring-shaped upward projection 29 that serves for centering the upper piston skirt 9. As may be seen from the drawing, the conical surface indicated by the lines 14 passes through the piston rod bearing 25 and the carrier portion 26 of the bottom piece of the piston, so that it is clear that a favorably rectilinear transfer of forces takes place through the piston structure.

The bottom piece 2 and the middle piece 3 are screwed together, like the piston head and the middle piece, by a number of necked-down screws 30. The screws 30 pass through bores 31 in the carrier portion 26 of the bottom piece 2 and are screwed into tapped bores 32 in the middle piece 3. The heads of the screws 30 are seated in cavities 33 provided in the core 24 and again are supported by means of spacing bushings 34 on the bottom piston piece 2.

For cooling of the piston, which in the illustrated example is done with oil, a coolant tube 35 is provided which connects the piston rod bearing with the space above the base 11 of the middle piece of the piston. In addition, coolant channels 36 are provided which connect the open underside of the piston with the spaces in the neighborhood of the upper piston skirt just below the piston face 4. Furthermore, bores (not shown) can be provided in the webs 12 and 13 for connecting several or all of the spaces beneath the piston face with each other.

The piston according to the present invention, in spite of a very thin piston face 4, which provides uniform temperature distribution and likewise uniform stress distribution in this component, can handle very high explosive forces, because the piston face is provided with multiple support. The explosive forces, furthermore, are transmitted to the piston rod bearing by the shortest and largely rectilinear path. Since the transmission of forces is accomplished mainly by web-like elements, the piston can be constructed relatively easily. The obtaining of light weight is facilitated by the fact that the very small radial movements that are produced by thermal stress are allowed to take place between the piston head and the middle piece. In this manner, as well as through the subdivision of the piston into three or more parts, a wide freedom of design is provided particularly for the selection of the materials to be used, which can be chosen particularly from the standpoint of a favorable light weight and a high durability. Since it is possible through this invention to secure the piston head in many places against axial movement relative to the middle piece, the pulling apart of these two pieces in a suction stroke and the consequent increased wear can be effectively prevented.

The term "built up" has been used in its common meaning designating the fact that the device in question is made of several pieces assembled together rather than from a single piece.

Although the invention has been described with respect to a specific embodiment, it will be understood that variations and modifications can be made within the inventive concept.

The preferred material for the middle piece 3 is spheroidally graphitic cast iron.

We claim:

1. In a built up engine piston comprising a piston head portion and a lower body portion demountably held together in mutually supporting relation by machine screws, the improvement in which:

the piston head portion has a relatively thin piston face (4);

at least two internal annular ridge (7, 8) at respectively different radial distances from the piston axis (A — A) and having a common center located on the piston axis, are provided on said piston head portion extending downwardly from said piston face to flat annular ridge summit surfaces;

said annular ridges support said piston head portion on said lower body portion, said annular ridges are tapped to receive the threads of said screws (16, 17), and said body portion (2) comprises a core portion (24) surrounding the piston rod bearing (25) and support means (26, 12, 13) extending from said core portion towards said annular ridges (7,8).

2. Improvement in an engine piston as defined in claim 1 in which the height of said ridges (7, 8) in the direction of said piston axis (A — A) corresponds substantially to the necessary depth for the threads of said screws (16, 17) and in which said annular ridge summit surfaces lie in the same plane.

3. Improvement in an engine piston as defined in claim 1 in which said piston head portion is made of steel.

4. Improvement in an engine piston as defined in claim 1 in which said piston head portion is made of cast steel.

5. Improvement in an engine piston as defined in claim 1 in which said piston head portion (1) is made in one piece with an upper piston skirt (5) provided with grooves (6) for seating piston rings and with projections (29) for centering on said lower body portion.

6. Improvement in an engine piston as defined in claim 1 in which said lower body portion is composed of a piston middle portion (3) and a piston bottom portion (2) demountably connected together by screws (30) located at a radial distance from said piston axis (A — A) greater than the corresponding radial dimension of said piston rod bearing (25), said piston bottom portion including said core portion of said piston body portion and an annular support member (26) of generally frusto-conical configuration with its widest part situated where said piston bottom portion meets said piston middle portion.

7. Improvement in an engine piston as defined in claim 6 in which said piston bottom portion (2) is made of a material selected from the group consisting of aluminum and of spheroidally graphitic cast iron.

8. Improvement in an engine piston as defined in claim 6 in which said piston middle portion (3) is made of a material having a larger elasticity modulus than gray cast iron.

9. Improvement in an engine piston as defined in claim 6 in which all of said screws (16, 17, 30) are in the form of necked-down screws and in which spacing bushing means (20, 21, 34) for guiding said screws are provided in the neighborhood of the screw heads.

10. Improvement in an engine piston as defined in claim 6 in which said screws (16, 17) securing said piston head portion (1) fasten said piston head portion (1) to said piston middle portion (3).

11. Improvement in an engine piston as defined in claim 3 in which piston middle portion (3) has a base portion of disk or flat ring shape facing said support member of piston lower portion (2) and is provided with extending annular support webs (12, 13) extending from the juncture with said support member (26) respectively to junctures with said ridges (7, 8) of said piston head portion (1).

12. Improvement in an engine piston as defined in claim 11 in which said piston bottom portion (2) comprises a piston skirt member (28), as well as said core portion (24) and said support member (26).

13. Improvement in an engine piston as defined in claim 11 in which said support webs (12, 13) are partly cut away in the neighborhood of each of the screws securing said piston head portion (1) to the remainder of the piston.

14. Improvement in an engine piston as defined in claim 13 in which said screws (16, 17) securing said piston head portion (1) are necked-down screws and in which the ratio of the cross section of the shaft of each screw (16, 17) to that of the bore where they pass through the joint surface between said piston head portion (1) and said piston middle portion (3) is such as to allow a small radial movement of said piston head portion relative to said piston middle portion.

15. Improvement in an engine piston as defined in claim 13 in which said support webs (12, 13) are both of generally frusto-conical shape and disposed in each case about the surface of a cone having its vertex on said piston axis (A — A).

16. Improvement in an engine piston as defined in claim 15 in which that one of said support webs (13) which connects with that one of said ridges (8) of said piston head portion (1) having the greater radial distance from said piston axis (A — A) is disposed on a conical surface of which the vertex is downwardly directed and said conical surface passes through said support member (26) and through said piston rod bearing (25).

17. Improvement in an engine piston as defined in claim 15 in which another of said support webs (12) is disposed on a conical surface having its vertex above the piston face (4).

* * * * *